(12) United States Patent
Shallal et al.

(10) Patent No.: US 12,147,285 B2
(45) Date of Patent: Nov. 19, 2024

(54) POWER MANAGEMENT INTEGRATED CIRCUIT DEVICE HAVING MULTIPLE INITIALIZATION/POWER UP MODES

(71) Applicant: Rambus Inc., San Jose, CA (US)

(72) Inventors: Aws Shallal, Cary, NC (US); Panduka Wijetunga, Thousand Oaks, CA (US)

(73) Assignee: Rambus Inc., San Jose, CA (US)

( * ) Notice: Subject to any disclaimer, the term of this patent is extended or adjusted under 35 U.S.C. 154(b) by 21 days.

(21) Appl. No.: 18/077,881

(22) Filed: Dec. 8, 2022

(65) Prior Publication Data

US 2023/0185351 A1 Jun. 15, 2023

Related U.S. Application Data

(60) Provisional application No. 63/287,913, filed on Dec. 9, 2021.

(51) Int. Cl.
G06F 1/32 (2019.01)
G05F 1/56 (2006.01)
G06F 1/3206 (2019.01)

(52) U.S. Cl.
CPC .............. *G06F 1/3206* (2013.01); *G05F 1/56* (2013.01)

(58) Field of Classification Search
CPC ..................................... G06F 1/32; G06F 1/26
See application file for complete search history.

(56) References Cited

U.S. PATENT DOCUMENTS

| | | | |
|---|---|---|---|
| 8,373,400 B2 | 2/2013 | Qiu et al. | |
| 9,558,435 B2 | 1/2017 | Ghimire et al. | |
| 2008/0046707 A1* | 2/2008 | Hirai | G06F 1/26 713/1 |
| 2010/0122096 A1 | 5/2010 | Ozenc | |
| 2012/0281437 A1 | 11/2012 | Fritz et al. | |
| 2014/0223153 A1* | 8/2014 | Hsieh | G06F 1/3206 713/1 |

(Continued)

OTHER PUBLICATIONS

Maxim Integrated, "Application Note 1136: Switching Between Battery and External Power Sources", Jun. 27, 2002. Downloaded at: https://www.maximintegrated.com/en/design/technical-documents/app-notes/1/1136.html. 4 pages.

*Primary Examiner* — Phil K Nguyen
(74) *Attorney, Agent, or Firm* — Womble Bond Dickinson (US) LLP

(57) ABSTRACT

Disclosed are techniques for a power management integrated circuit (PMIC) to support a power-up sequence from a powered-down state to a powered-up state when both a main supply voltage and a backup supply voltage are present or when only the backup supply voltage is present. The PMIC may monitor the two supply voltages to identify the supply voltages that are present. The PMIC may be configured with a power-up initialization mode of operation through an EFUSE/MTP register, including a first bit to control power up of a voltage regulator of the PMIC with the main supply voltage or the backup supply voltage. Another bit may control power up of the voltage regulator with the backup supply voltage in the dual-supply or the single-supply configuration. The PMIC may execute one of four power-up sequences based on the monitored status of the supply voltages and the configured power-up initialization mode of operation.

20 Claims, 6 Drawing Sheets

(56) References Cited

U.S. PATENT DOCUMENTS

| | | | |
|---|---|---|---|
| 2015/0323325 A1* | 11/2015 | Caporizzo | G01S 7/497 701/400 |
| 2018/0136322 A1* | 5/2018 | Caporizzo | G01S 7/003 |

* cited by examiner

POWER MANAGEMENT INTEGRATED CIRCUIT DEVICE HAVING MULTIPLE INITIALIZATION/POWER UP MODES

CROSS REFERENCE TO RELATED APPLICATIONS

This application claims the benefit of U.S. Provisional Application No. 63/287,913 filed on Dec. 9, 2021, the disclosure of which is incorporated herein by reference in their entirety.

TECHNICAL FIELD

This disclosure generally relates to technologies for power management for memory systems. More specifically, the disclosure relates to systems and methods for multiple initialization and power up sequences of power management devices used in memory systems for the power management devices to support memory systems having dual-input or single-input voltage supplies.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
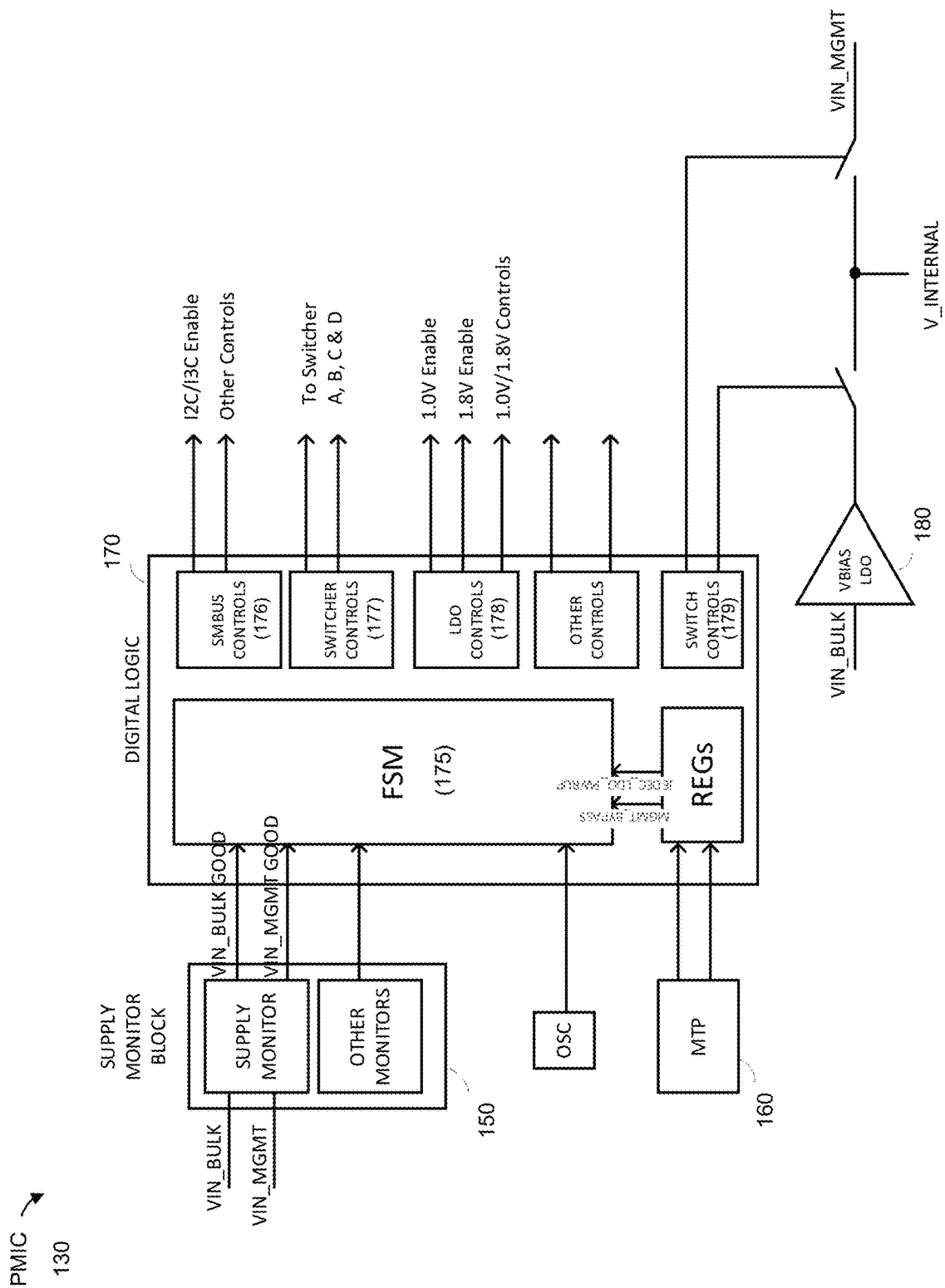
FIG. 1 depicts a block diagram of a power management integrated circuit device (PMIC) for a memory system in accordance with one aspect of the present disclosure.

Examples of various aspects and variations of the subject technology are described herein and illustrated in the accompanying drawings. The following description is not intended to limit the invention to these embodiments, but rather to enable a person skilled in the art to make and use this invention.

In various embodiments, described is a power management integrated circuit device (PMIC) to supply regulated voltages to components of a memory system. For example, in a dual-inline memory module (DIMM), a PMIC may regulate and distribute a 1.1 V VDD supply voltage to a plurality of dynamic random access memory (DRAM) devices, a buffer chip registering clock driver (RCD), and data buffer (DB), etc. The PMIC may control highly-granular system power loading to improve the signal integrity and noise immunity of the signals in the memory system. In a legacy mode according to a specific embodiment two input supply voltages, a lower main supply voltage (e.g., 3.0-3.6 V), referred to as the management voltage or VIN_MGMT, and a higher backup supply voltage (e.g., 4.25-15.0 V), refer to as the bulk voltage or VIN_BULK. The VIN_MGMT may be used by low dropout (LDO) voltage regulators to generate the voltages (e.g., 1.8 V, 1.0V) for the internal digital and control logic of the PMIC. The VIN_BULK may be used by switching voltage regulators such as buck converters to generate the 1.1 V VDD supply voltage for the DRAM and other components of the memory module. In legacy mode, the PMIC assumes that both supply voltages are present when the PMIC goes through power-up initialization, although after power-up, the VIN_MGMT may be temporarily shut down. In that case, the PMIC automatically switches over to the VIN_BULK. For example, when the VIN_MGMT is not available after power-up, the LDO voltage regulators may switch over to use a regulated and stepped-down voltage of VIN_BULK.

In an embodiment, for example, to provide the flexibility for memory system designers to architect DIMM supplied with only a single voltage, the PMIC supports a power-up initialization sequence with only the VIN_BULK available. The PMIC may be configured with multiple modes of power-up initialization to support a DIMM using both a legacy (dual-input) supply voltages or a DIMM using a single-input supply voltage. Disclosed are techniques for the PMIC to support a power-up sequence from an initialization state to a configuration state ready to receive instructions from a host device when both VIN_MGMT and VIN_BULK are present or when only the VIN_BULK is present. The PMIC may have a supply monitor circuit to monitor the VIN_MGMT and VIN_BULK to identify the supply voltages that are present. The PMIC may be configured with a power-up initialization mode of operation through an EFUSE or a multiple-time programmable (MTP) register. The power-up initialization mode of operation may include a bit to control power up of the LDO with VIN_MGMT or VIN_BULK, and when powering up the LDO with VIN_BULK, a bit to control the LDO power up in the dual-supply configuration or the single-supply configuration. The PMIC may execute one of four power-up sequences based on the monitored status of the supply voltages and the configured power-up initialization mode of operation.

FIG. 1 depicts a block diagram of a part of the PMIC 130 for a memory system in accordance with one aspect of the present disclosure. The PMIC 130 may have a supply monitor block 150 to monitor the VIN_BULK and VIN_MGMT to identify which voltage supplies are present, as indicated by the VIN_BULK_GOOD and VIN_MGMT_GOOD signals, respectively. In one aspect, the VIN_BULK or the VIN_MGMT is identified as present when voltage is above a minimum threshold voltage. A MTP register 160 may store the configured PMIC power-up initialization mode of operation using two bits, JEDEC_L-DO_PWRUP and MGMT_BYPASS. The JEDEC_L-

DO_PWRUP bit may control the power up of the LDO with VIN_MGMT or VIN_BULK; the MGMT_BYPASS bit may control the power up of the LDO in the dual-supply configuration or the single-supply configuration when the LDO is powered up with VIN_BULK. In one aspect, a host device may configure the MTP register 160 to identify the power-up initialization mode operation through a serial interface or the MTP register may be preconfigured. In one aspect, the MTP may be a one-time programmable EFUSE.

A finite state machine (FSM) 175 of the digital logic 170 may receive the monitored voltage signals and the two configured bits to execute a power-up initialization sequence to bring the PMIC 130 from an initialization state to a configuration state in which the PMIC waits for a host operation. In one aspect, there may be four power-up initialization sequences including scenarios when (1) VIN_MGMT is present before VIN_BULK in the dual-supply configuration to power up the LDO with VIN_MGMT, (2) VIN_MGMT is present after VIN_BULK in the dual-supply configuration to power up the LDO with VIN_MGMT, (3) VIN_BULK is present in the single-supply configuration to power up the LDO with VIN_BULK, and (4) VIN_MGMT is present after VIN_BULK in the dual-supply configuration and the LDO is powered up early with VIN_BULK prior to VIN_MGMT.

The digital logic 170 may contain other blocks to control the voltage regulation, peripheral interface, monitoring functions such as voltage, current, temperature sensing, etc. of the PMIC 130. For example, a SMBUS control module 176 may control the operation of the I2C/I3C serial interface; a switcher control module 177 may control the operation of the switching voltage regulators such as buck converters to generate the 1.1 V VDD supply voltage from VIN_BULK for the DRAM, RCD, DB, etc., of the memory system; a LDO control module 178 may control the operation of the LDO regulators to generate the 1.0 V/1.8 V from VIN_MGMT or VIN_BULK for internal use by the PMIC 130 or for consumption by other components of the memory system; a switching control module 179 may control the generation of the internal voltage V_INTERNAL (may also be called VBIAS) used to trigger the power-up initialization sequence. V_INTERNAL may be generated from either VIN_MGMT or VIN_BULK depending on the power-up initialization sequence. If VIN_MGMT is present, V_INTERNAL is driven by VIN_MGMT. If VIN_MGMT is not present such as when VIN_BULK is powered first or when only VIN_BULK is present in the single-supply configuration, switching control module 179 may enable an internal VBIAS LDO 180 to drive V_INTERNAL from VIN_BULK.

Figure 2:
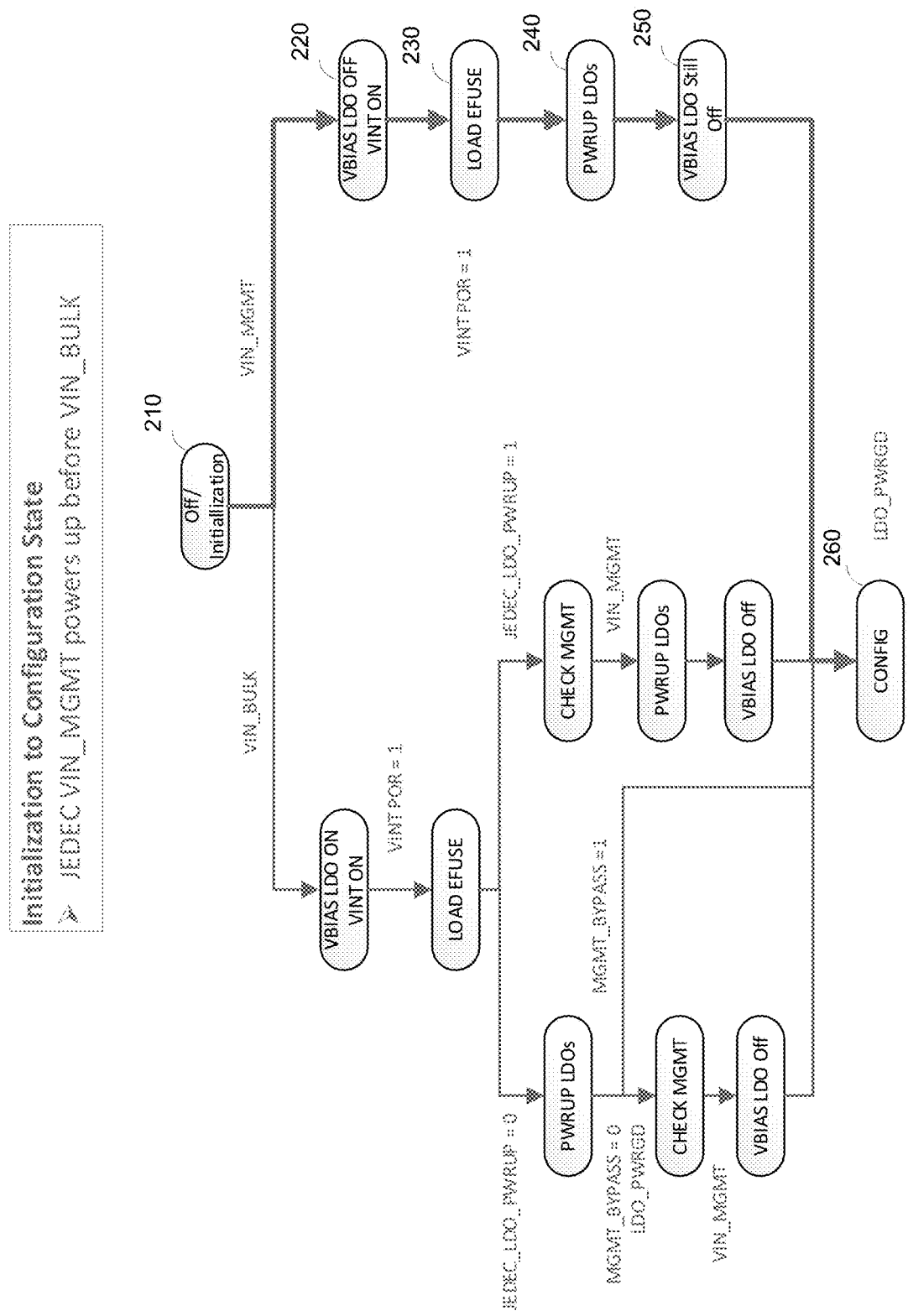
FIG. 2 illustrates a power-up initialization sequence of the PMIC in a mode of operation when the main supply voltage powers up before the backup supply voltage in accordance with one aspect of the present disclosure.

FIG. 2 illustrates a power-up initialization sequence of the PMIC in a mode of operation when the VIN_MGMT powers up before the VIN_BULK in accordance with one aspect of the present disclosure. The power-up initialization sequence may be executed by the finite state machine (FSM) 175. In an embodiment, when the VIN_MGMT powers up first, the PMIC assumes it is operating in the legacy (e.g., as specified by standards promulgated by the Joint Electron Device Engineering Council of Solid Technology (JEDEC)) dual-supply configuration and the power-up initialization sequence is the same regardless of the setting of the PMIC power-up initialization mode. FIG. 2 represents the scenario when VIN_MGMT is present before VIN_BULK in the dual-supply configuration to power up the LDO with VIN_MGMT.

The PMIC may be at the initialization state 210 waiting for indications that VIN_MGMT or VIN_BULK is present from the supply monitor block 150. When the VIN_MGMT is indicated as present, V_INTERNAL is driven by VIN_MGMT and VBIAS LDO 180 is turned off at operation 220. When the V_INTERNAL is above a power-on reset (POR) threshold, the POR may be triggered as indicated by VINT POR=1. The POR wakes up the digital logic 170 to trigger a read of the configured PMIC power-up initialization mode (e.g., JEDEC_LDO_PWRUP and MGMT_BYPASS from the MTP register 160) by the FSM 175 at operation 230. As mentioned, the power-up initialization sequence in this scenario is the same regardless of the configured mode. The FSM 175 may enable the LDO regulators to generate the 1.0 V/1.8 V from VIN_MGMT at operation 240. The V_INTERNAL remains driven by the VIN_MGMT even if VIN_BULK is present by keeping the VBIAS LDO 180 turned off at operation 250. When the 1.0 V/1.8 V from the LDO regulators become valid (e.g., as indicated by an LDO_PWRGD signal), the I2C/I3C serial interface may be enabled. When the VIN_BULK is present, the PMIC may enter the configuration state 260 to wait for instructions from the host. The host may instruct the PMIC to enable the switching regulators to generate the 1.1 V VDD supply voltage from V_BULK for the memory system.

Figure 3:
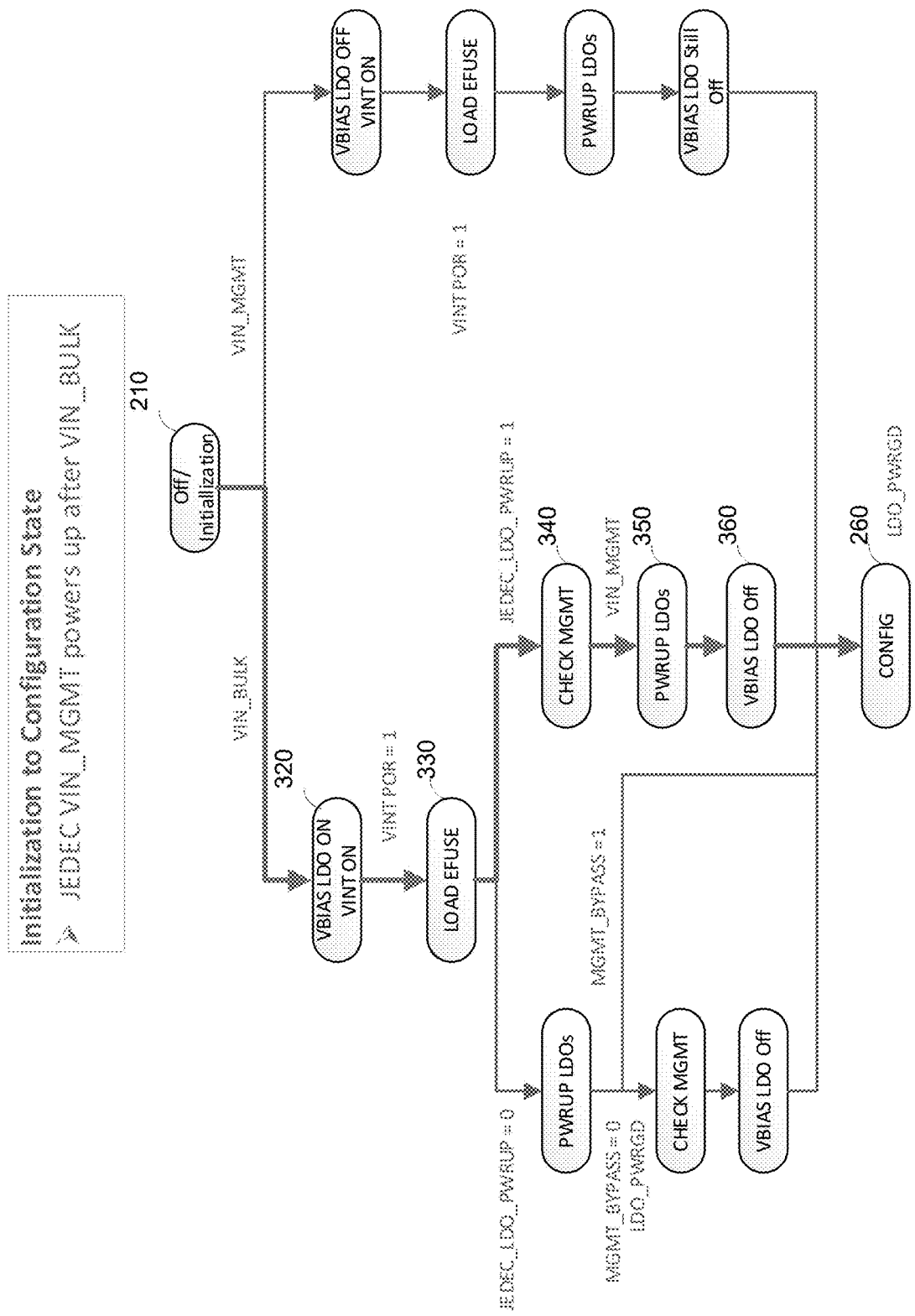
FIG. 3 illustrates a power-up initialization sequence of the PMIC in a mode of operation when the main supply voltage powers up after the backup supply voltage in accordance with one aspect of the present disclosure.

FIG. 3 illustrates a power-up initialization sequence of the PMIC in a mode of operation when the VIN_MGMT powers up after the VIN_BULK in accordance with one aspect of the present disclosure. The power-up initialization sequence may be executed by the FSM 175. FIG. 3 represents the scenario when VIN_MGMT is present after VIN_BULK in the dual-supply configuration to power up the LDO with VIN_MGMT.

From the initialization state 210, when the VIN_BULK is indicated as present prior to VIN_MGMT, V_INTERNAL is driven by VIN_BULK by turning on the VBIAS LDO 180 at operation 320. As before, when the V_INTERNAL is above the POR threshold, the POR may be triggered as indicated by VINT POR=1. The POR wakes up the digital logic 170 to trigger a read of the configured PMIC power-up initialization mode by the FSM 175 at operation 330. When the MTP read indicates JEDEC_LDO_PWRUP=1, the PMIC may wait for the presence of VIN_MGMT before powering up the LDO.

At operation 340, the PMIC waits for the detection of VIN_MGMT. When VIN_MGMT is indicated as present, the FSM 175 may enable the LDO regulators to generate the 1.0 V/1.8 V from VIN_MGMT at operation 350. The VIN_INTERNAL is switched to being driven by VIN_MGMT and the VBIAS LDO 180 is turned off at operation 360. When the 1.0 V/1.8 V from the LDO regulators become valid the PMIC may enter the configuration state 260 to wait for instructions from the host. The host may instruct the PMIC to enable the switching regulators to generate the 1.1 V VDD supply voltage from V_BULK for the memory system.

Figure 4:
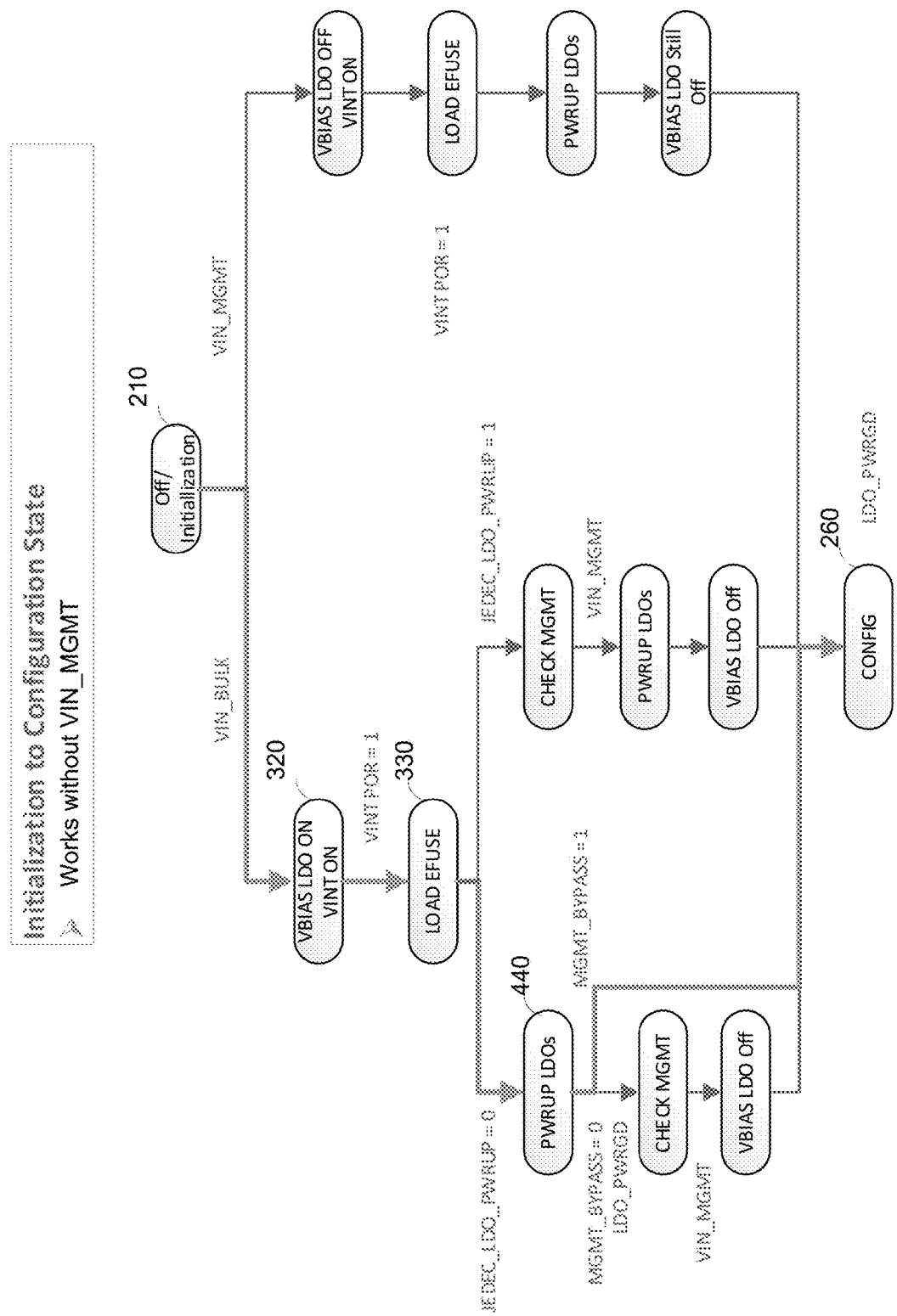
FIG. 4 illustrates a power-up initialization sequence of the PMIC in a mode of operation when only the backup supply voltage input powers up accordance with one aspect of the present disclosure.

FIG. 4 illustrates a power-up initialization sequence of the PMIC in a mode of operation when only the VIN_BULK powers up accordance with one aspect of the present disclosure. The power-up initialization sequence may be executed by the FSM 175. FIG. 4 represents the scenario when VIN_BULK is present in the single-supply configuration to power up the LDO with VIN_BULK.

As in FIG. 3, from the initialization state 210, when the VIN_BULK is indicated as present prior to VIN_MGMT, V_INTERNAL is driven by VIN_BULK by turning on the VBIAS LDO 180 at operation 320. When the V_INTERNAL is above the POR threshold, the POR may be triggered as indicated by VINT POR=1. The POR wakes up the digital logic 170 to trigger a read of the configured PMIC power-up initialization mode by the FSM 175 at operation 330. When the MTP read indicates JEDEC_LDO_PWRUP=0 and MGMT_BYPASS=1, the PMIC is configured to operate using the single VIN_BULK supply, and not simply supporting VIN_BULK as a secondary feature. In the single-supply VIN_BULK configuration, VIN_MGMT and the monitored VIN_MGMT_GOOD signal are ignored and VBIAS LDO 180 remains turned on to drive V_INTERNAL using V_BULK.

At operation 440, the FSM enables the LDO regulators to generate the 1.0 V/1.8 V from VIN_BULK. After the 1.0 V/1.8 V from the LDO regulators become valid the PMIC may enter the configuration state 260 without waiting for VIN_MGMT. In the configuration state 260, the host may instruct the PMIC to enable the switching regulators to generate the 1.1 V VDD supply voltage from V_BULK for the memory system. The PMIC may operate normally to enable all features in the single-supply VIN_BULK configuration independent of V_MGMT.

Figure 5:
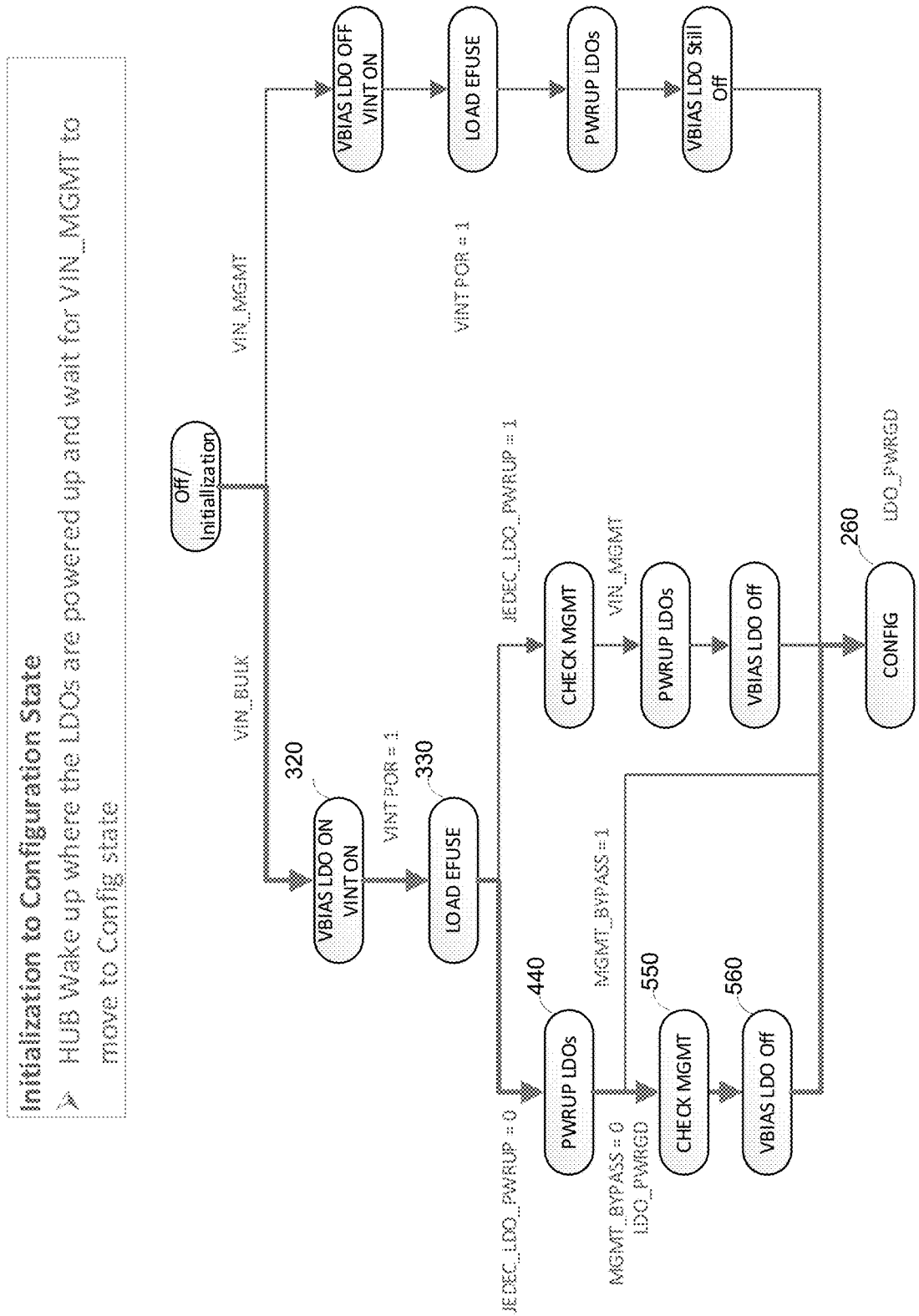
FIG. 5 illustrates a power-up initialization sequence of the PMIC in a mode of operation when the backup supply voltage powers up first to enable the low dropout voltage regulators while waiting for the main supply voltage to power up in accordance with one aspect of the present disclosure.

FIG. 5 illustrates a power-up initialization sequence of the PMIC in a mode of operation when VIN_BULK powers up first to enable the low dropout voltage regulators while waiting for the V_MGMT to power up in accordance with one aspect of the present disclosure. The power-up initialization sequence may be executed by the FSM 175. FIG. 5 represents the scenario when VIN_MGMT is present after VIN_BULK in the dual-supply configuration and the LDO is powered up early with VIN_BULK prior to VIN_MGMT.

As in FIG. 4, from the initialization state 210, when the VIN_BULK is indicated as present prior to VIN_MGMT, V_INTERNAL is driven by VIN_BULK by turning on the VBIAS LDO 180 at operation 320. When the V_INTERNAL is above the POR threshold, the POR may be triggered as indicated by VINT POR=1. The POR wakes up the digital logic 170 to trigger a read of the configured PMIC power-up initialization mode by the FSM 175 at operation 330. When the MTP read indicates JEDEC_LDO_PWRUP=0 and MGMT_BYPASS=0, the PMIC is configured to power up the LDO regulators without waiting for VIN_MGMT to power up but does not enter configuration state until VIN_MGMT is present. This scenario may also be referred to as the hub wake up mode to enable the I2C/I3C serial interface prior to VIN_MGMT.

At operation 440, the FSM enables the LDO regulators to generate the 1.0 V/1.8 V from VIN_BULK. After the 1.0 V/1.8 V from the LDO regulators become valid the PMIC may monitor for the presence of VIN_MGMT at operation 550. When VIN_MGMT becomes present, the VIN_INTERNAL is switched to being driven by VIN_MGMT and the VBIAS LDO 180 is turned off at operation 560. When the 1.0 V/1.8 V from the LDO regulators are valid and the VIN_MGMT is present, the PMIC may enter the configuration state 260 to wait for instructions from the host. The host may instruct the PMIC to enable the switching regulators to generate the 1.1 V VDD supply voltage from V_BULK for the memory system. Both FIG. 5 and FIG. 3 represent the dual-supply configuration in which VIN_BULK powers up first before VIN_MGMT, but the power-up initialization sequence in FIG. 5 may power up the LDO regulators earlier than that in FIG. 3 without waiting for VIN_MGMT, thus reducing the time for the PMIC to complete the power-up initialization.

Figure 6:
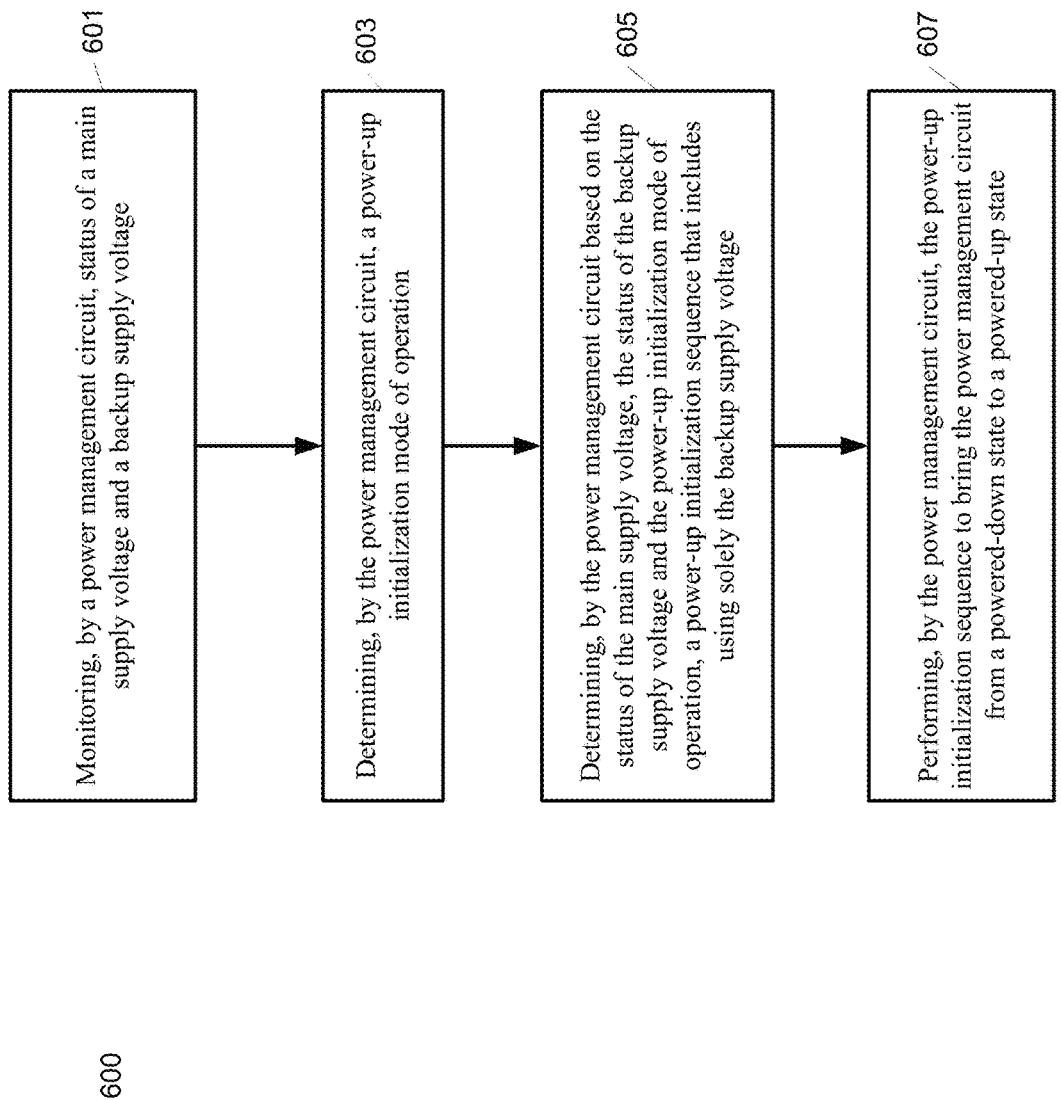
FIG. 6 illustrates a flow diagram of a method for a PMIC to monitor the status of the backup and main supply voltages to execute a power-up initialization sequence based on the configured initialization mode of operation in the accordance with one aspect of the present disclosure.

FIG. 6 illustrates a flow diagram of a method 600 for a PMIC to monitor the status of the VIN_BULK and VIN_MGMT to execute a power-up initialization sequence based on the configured initialization mode of operation in the accordance with one aspect of the present disclosure. In one aspect, the method 6000 may be performed by the PMIC utilizing hardware, software, or combinations of hardware and software.

In operation 601, the PMIC monitors status of a main supply voltage (e.g., VIN_MGMT) and a backup supply voltage (e.g., VIN_BULK). The PMIC is capable of operating in a dual-supply configuration in which both the main supply voltage and the backup supply voltage are supplied or in a single-supply configuration with only the backup supply voltage. In one aspect, the PMIC may monitor the main supply voltage and the backup supply voltage to identify the presence of one or both of the voltage supplies such as when the voltage supplies cross a minimum threshold voltage during power-up.

In operation 603, the PMIC determines a power-up initialization mode of operation. The power-up initialization mode of operation may be determined from two bits that are preconfigured in a MTP or a EFUSE register or may be configured by a host through a serial interface. A first bit (e.g., JEDEC_LDO_PWRUP) may identify an initialization operation to power up a voltage regulator (e.g., LDO) of the PMIC using the main voltage supply or the backup voltage supply. A second bit (e.g., MGMT_BYPASS) may identify an initialization operation to power up the voltage regulator using the backup voltage supply in either the dual-supply configuration or the single-supply configuration.

In operation 605, the PMIC determines, based the status of the main supply voltage, the status of the backup voltage, and the power-up initialization mode of operation, a power-up initialization sequence that includes using solely the backup supply voltage in the single-supply configuration. In one aspect, there may be four power-up initialization sequences including scenarios when (1) the main supply voltage is present before the backup supply voltage in the dual-supply configuration to power up the voltage regulator with the main supply voltage, (2) the main supply voltage is present after the backup supply voltage in the dual-supply configuration to power up the voltage regulator with main supply voltage, (3) the backup supply voltage is present in the single-supply configuration to power up the voltage regulator with the backup supply voltage, and (4) the main supply voltage is present after the backup supply voltage in the dual-supply configuration and the voltage regulator is powered up early with the backup supply voltage prior to the main supply voltage.

In operation 607, the PMIC performs the power-up initialization sequence to bring the PMIC from a powered-down state to a powered-up state. In the powered-up state, the PMIC may generate regulated voltages to supply to other circuits in the dual-supply configuration or the single-supply configuration. In an embodiment, the PMIC may supply regulated voltages to components of a DDR5 DIMM.

Various aspects of the techniques for a PMIC to support a power-up initialization sequence in a dual-supply configuration or a single-supply configuration described herein may include various operations. These operations may be performed and/or controlled by hardware components, digital hardware and/or firmware/programmable registers (e.g., as implemented in computer-readable medium), and/or combinations thereof. The methods and illustrative examples described herein are not inherently related to any particular device or other apparatus. Various systems (e.g., such as a FSM) may be used in accordance with the teachings described herein, or it may prove convenient to construct more specialized apparatus to perform the required method steps. The required structure for a variety of these systems will appear as set forth in the description above.

In one embodiment, the PMIC may include a memory and a processing device. The memory may be synchronous dynamic random access memory (DRAM), read-only memory (ROM)), or other types of memory, which may be configured to store the code to perform the function of the PMIC. The processing device may be provided by one or more general-purpose processing devices such as a microprocessor, central processing unit, or the like. In an illustrative example, processing device may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device may also comprise one or more special-purpose processing devices such as an application specific integrated circuit (ASIC), a field programmable gate array (FPGA), a digital signal processor (DSP), network processor, or the like. The processing device may be configured to execute the operations described herein, in accordance with one or more aspects of the present disclosure, for performing the operations and steps discussed herein.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A power management integrated circuit (PMIC) comprising:
   a monitoring circuit configured to monitor a status of a main supply voltage and a status of a backup supply voltage; and
   a circuit to:
      receive the status of the main supply voltage and the status of the backup supply voltage;
      receive a signal indicating a power-up initialization mode of operation;
      determine, based on the status of the main supply voltage and the status of the backup supply voltage, a timing indicating whether the main supply voltage is present before the backup supply voltage is present or the main supply voltage is present after the backup supply voltage is present;

determine a power-up initialization sequence based on the status of the main supply voltage, the status of the backup supply voltage, the signal, and the timing indicating whether the main supply voltage is present before the backup supply voltage or the main supply voltage is present after the backup supply voltage; and perform the power-up initialization sequence to bring the PMIC from a powered-down state to a powered-up state, wherein the power-up initialization sequence includes a sequence based solely on the backup supply voltage.

2. The PMIC of claim 1, wherein the signal indicating the power-up initialization mode of operation is based on a value stored in a programmable register.

3. The PMIC of claim 2, wherein the programmable register is programmed by a host device that communicates with the PMIC.

4. The PMIC of claim 1, wherein the PMIC further comprises a voltage regulator configurable to generate a regulated voltage using the main supply voltage or the backup supply voltage, and wherein the signal indicating the power-up initialization mode of operation includes:

a first bit to identify one of the main supply voltage or the backup supply voltage to power up the voltage regulator; and a second bit to identify using the backup supply voltage to power up the voltage regulator when either the main supply voltage and the backup supply voltage are both present or when only the backup supply voltage is present.

5. The PMIC of claim 4, wherein the power-up initialization sequence is to determine that the main supply voltage is present before the backup supply voltage as indicated by the status of the main supply voltage and the backup supply voltage in a dual-supply configuration; and configure the voltage regulator to power up using the main supply voltage.

6. The PMIC of claim 4, wherein the power-up initialization sequence is to:

determine using the first bit that the main supply voltage is to be used to power up the voltage regulator in a dual-supply configuration;

determine that the main supply voltage is present after the backup supply voltage as indicated by the status of the main supply voltage and the backup supply voltage; and configure the voltage regulator to power up using the main supply voltage.

7. The PMIC of claim 4, wherein the power-up initialization sequence is to:

determine using the first bit that the backup supply voltage is to be used to power up the voltage regulator;

determine using the second bit that the backup supply voltage is to be used to power up the voltage regulator in a single-supply configuration when only the backup supply voltage is present;

determine that the backup supply voltage is present as indicated by the status of the backup supply voltage; and configure the voltage regulator to power up using the backup supply voltage.

8. The PMIC of claim 4, wherein the power-up initialization sequence is to:

determine using the first bit that the backup supply voltage is to be used to power up the voltage regulator;

determine using the second bit that the backup supply voltage is to be used to power up the voltage regulator in a dual-supply configuration;

determine that the main supply voltage is present after the backup supply voltage as indicated by the status of the main supply voltage and the backup supply voltage; and configure the voltage regulator to power up using the backup supply voltage.

9. The PMIC of claim 1, wherein the monitoring circuit indicates in the status that the main supply voltage or the backup supply voltage is present corresponding to when the main supply voltage or the backup supply voltage is above a threshold voltage.

10. The PMIC of claim 1, wherein in the powered-up state, the PMIC is ready to communicate with a host device.

11. A method for powering up a power management integrated circuit (PMIC) device, comprising:

monitoring, by the PMIC device, a status of a main supply voltage and a status of a backup supply voltage;

determining, by the PMIC device, a power-up initialization mode of operation;

determining, based on the status of the main supply voltage and the status of the backup supply voltage, a timing indicating whether the main supply voltage is present before the backup supply voltage is present or the main supply voltage is present after the backup supply voltage is present;

determining, by the PMIC device, a power-up initialization sequence based on the status of the main supply voltage, the status of the backup supply voltage, the power-up initialization mode of operation, and the timing indicating whether the main supply voltage is present before the backup supply voltage or the main supply voltage is present after the backup supply voltage; and performing, by the PMIC device, the power-up initialization sequence to bring the PMIC device from a powered-down state to a powered-up state, wherein the power-up initialization sequence includes a sequence based solely on the backup supply voltage.

12. The method of claim 11, wherein the power-up initialization mode of operation is either preconfigured on the PMIC or is configurable by a host device that communicates with the PMIC.

13. The method of claim 11, wherein the power-up initialization sequence comprises powering up a voltage regulator using the main supply voltage or the backup supply voltage, and wherein the power-up initialization mode of operation comprises:

determining based on a first bit of the power-up initialization mode of operation to use one of the main supply voltage or the backup supply voltage to power up the voltage regulator; and determining based on a second bit of the power-up initialization mode of operation to use the backup supply voltage to power up the voltage regulator when either the main supply voltage and the backup supply voltage are both present or when only the backup supply voltage is present.

14. The method of claim 13, wherein the power-up initialization sequence comprises:

determining that the main supply voltage is present before the backup supply voltage as indicated by the status of the main supply voltage and the backup supply voltage in a dual-supply configuration; and configuring the voltage regulator to power up using the main supply voltage.

15. The method of claim 13, wherein the power-up initialization sequence comprises:
determining based on the first bit to use the main supply voltage to power up the voltage regulator in a dual-supply configuration;
determining that the main supply voltage is present after the backup supply voltage as indicated by the status of the main supply voltage and the backup supply voltage; and
configuring the voltage regulator to power up using the main supply voltage.

16. The method of claim 13, wherein the power-up initialization sequence comprises:
determining based on the first bit to use the backup supply voltage to power up the voltage regulator;
determining based on the second bit to use the backup supply voltage to power up the voltage regulator in a single-supply configuration when only the backup supply voltage is present;
determining the backup supply voltage is present as indicated by the status of the backup supply voltage; and
configuring the voltage regulator to power up using the backup supply voltage.

17. The method of claim 13, wherein the power-up initialization sequence comprises:
determining based on the first bit to use the backup supply voltage to power up the voltage regulator;
determining based on the second bit to use the backup supply voltage to power up the voltage regulator in a dual-supply configuration;
determining the main supply voltage is present after the backup supply voltage as indicated by the status of the main supply voltage and the backup supply voltage; and
configuring the voltage regulator to power up using the backup supply voltage.

18. The method of claim 11, wherein the status indicates that the main supply voltage or the backup supply voltage is present corresponding to when the main supply voltage or the backup supply voltage is above a threshold voltage.

19. The method of claim 11, wherein in the powered-up state, the PMIC device is ready to communicate with a host device.

20. A non-transitory computer-readable medium having instructions stored therein, which when executed by a processor, cause the processor to perform operations, the operations comprising:
monitoring status of a main supply voltage and a backup supply voltage;
determining a power-up initialization mode of operation;
determining, based on the status of the main supply voltage and the status of the backup supply voltage, a timing indicating whether the main supply voltage is present before the backup supply voltage is present or the main supply voltage is present after the backup supply voltage is present;
determining a power-up initialization sequence based on the status of the main supply voltage, the status of the backup supply voltage, the power-up initialization mode of operation, and the timing indicating whether the main supply voltage is present before the backup supply voltage or the main supply voltage is present after the backup supply voltage; and
performing the power-up initialization sequence to bring a device from a powered-down state to a powered-up state, wherein the power-up initialization sequence includes a sequence based solely on the backup supply voltage.

* * * * *